(12) United States Patent
Hashimoto et al.

(10) Patent No.: US 9,923,233 B2
(45) Date of Patent: Mar. 20, 2018

(54) METHOD FOR PRODUCING LITHIUM COMPOSITION AND METHOD FOR PRODUCING SULFIDE SOLID ELECTROLYTE MATERIAL

(71) Applicant: Toyota Jidosha Kabushiki Kaisha, Toyota-shi, Aichi-ken (JP)

(72) Inventors: Yuichi Hashimoto, Numazu (JP); Takuo Yanagi, Toyota (JP); Takayoshi Doi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 109 days.

(21) Appl. No.: 15/172,739

(22) Filed: Jun. 3, 2016

(65) Prior Publication Data
US 2016/0365603 A1    Dec. 15, 2016

(30) Foreign Application Priority Data

Jun. 12, 2015   (JP) .................. 2015-119198

(51) Int. Cl.
| | |
|---|---|
| *H01M 10/0562* | (2010.01) |
| *C03C 3/32* | (2006.01) |
| *H01M 10/0525* | (2010.01) |
| *C01D 3/12* | (2006.01) |
| *C01B 17/22* | (2006.01) |
| *C01D 15/00* | (2006.01) |

(52) U.S. Cl.
CPC ......... *H01M 10/0562* (2013.01); *C01B 17/22* (2013.01); *C01D 3/12* (2013.01); *H01M 10/0525* (2013.01); *C01D 15/00* (2013.01); *H01M 2300/002* (2013.01); *H01M 2300/0068* (2013.01)

(58) Field of Classification Search
CPC .......... C01B 17/22; C01D 3/12; C01D 15/00; H01M 10/0562; H01M 10/0525; H01M 2300/002; H01M 2300/0068
See application file for complete search history.

(56) References Cited

U.S. PATENT DOCUMENTS

| | | |
|---|---|---|
| 4,126,666 A | 11/1978 | Jacob et al. |
| 2014/0272554 A1 | 9/2014 | Yanagi et al. |

FOREIGN PATENT DOCUMENTS

| | | |
|---|---|---|
| JP | H07242414 A | 9/1995 |
| JP | 2014179265 A | 9/2014 |
| JP | 2014-186820 A | 10/2014 |

*Primary Examiner* — C Melissa Koslow
(74) *Attorney, Agent, or Firm* — Dinsmore & Shohl LLP

(57) ABSTRACT

A method for producing a lithium composition capable of suppressing the generation of polysulfides is provided. The method for producing a lithium composition includes a first aqueous solution forming step of forming a first aqueous solution by reacting iodine with a reducing aqueous solution containing calcium oxide, formic acid, and water under a condition of a pH of 5.5 or more and a pH of 10.21 or less through heating, a second aqueous solution forming step of forming a second aqueous solution by adding calcium oxide to the first aqueous solution, a third aqueous solution forming step of forming a third aqueous solution by adding lithium carbonate to the second aqueous solution, and a $Li_2S$ forming step of forming the lithium sulfide ($Li_2S$) by sulfurizing lithium hydroxide (LiOH) to form lithium hydrosulfide (LiHS) and then eliminating hydrogen sulfide from lithium hydrosulfide (LiHS).

6 Claims, 3 Drawing Sheets

Prior Art

METHOD FOR PRODUCING LITHIUM COMPOSITION AND METHOD FOR PRODUCING SULFIDE SOLID ELECTROLYTE MATERIAL

CROSS-REFERENCE TO RELATED APPLICATION

This application claims priority to Japanese Patent Application No. 2015-119198 filed on Jun. 12, 2015, the entire contents of which are hereby incorporated by reference into the present application.

TECHNICAL FIELD

The present disclosure relates to a method for producing a lithium composition which can suppress the generation of polysulfides.

BACKGROUND

Sulfide solid electrolyte materials exhibit high Li ion conductivity to be useful in achieving a higher output of the battery. As a raw material of sulfide solid electrolyte materials, for example, lithium compositions containing $Li_2S$ and LiI are known.

A method for synthesizing a lithium composition is disclosed in Patent Literature 1 (Japanese Patent Application Laid-Open No. 2014-179265) in which a raw material mixture containing LiHS and LiX (X represents F, Cl, Br, or I) is prepared from a single Li source and LiHS in the raw material mixture is converted into $Li_2S$ by eliminating hydrogen sulfide. In addition, a method for obtaining the raw material mixture is disclosed in Patent Literature 1 in which a reduction treatment to fabricate an aqueous solution containing a hydroxide of Me and a halide of Me by reacting a hydroxide of a metal (Me) (such as calcium hydroxide), halogen (such as iodine), and formic acid with one another, a substitution treatment to obtain lithium hydroxide and lithium halide by substituting Me with Li, and sulfurization treatment to obtain lithium hydrosulfide by sulfurizing lithium hydroxide are conducted.

Lithium compositions are desired to contain fewer impurities since they are used as, for example, a raw material of a sulfide solid electrolyte material. However, in conventional methods for producing lithium compositions, polysulfides are generated during the sulfurization treatment in some cases.

Polysulfides (such as $HS_n^-$ and $S_n^{2-}$) are those in which an indefinite amount of sulfur is joined in a linear or cyclic form, and it is believed that the sulfur colloid is produced as a particulate product derived from the polysulfide. Accordingly a method for producing a lithium composition which can suppress the generation of polysulfides is desired.

SUMMARY

The present disclosure has been made in view of the above circumstances, and an object thereof is to provide a method for producing a lithium composition which can suppress the generation of polysulfides and a method for producing a sulfide solid electrolyte material using the lithium composition.

In order to solve the above problem, the present disclosure provides a method for producing a lithium composition comprising at least lithium sulfide ($Li_2S$) and lithium iodide (LiI); the method comprising steps of: a first aqueous solution forming step of forming a first aqueous solution containing calcium iodide ($CaI_2$) by reacting iodine with a reducing aqueous solution containing calcium oxide, formic acid, and water under a condition of a pH of 5.5 or more and a pH of 10.21 or less through heating; a second aqueous solution forming step of forming a second aqueous solution containing calcium hydroxide ($Ca(OH)_2$) and the calcium iodide ($CaI_2$) by adding calcium oxide to the first aqueous solution; a third aqueous solution forming step of forming a third aqueous solution containing lithium hydroxide (LiOH) and lithium iodide (LiI) by adding lithium carbonate to the second aqueous solution; and a $Li_2S$ forming step of forming the lithium sulfide ($Li_2S$) by sulfurizing the lithium hydroxide (LiOH) to form lithium hydrosulfide (LiHS) and then eliminating hydrogen sulfide from the lithium hydrosulfide (LiHS).

According to methods described in the present disclosure, it is possible to obtain a lithium composition in which the generation of polysulfides is suppressed by reacting iodine with a reducing aqueous solution containing calcium oxide, formic acid, and water at circumneutral pH in the first aqueous solution forming step.

In embodiments, it is preferable that an iodine-containing aqueous solution, which contains the iodine and water, is heated and then the reducing aqueous solution is added to the heated iodine-containing aqueous solution in the first aqueous solution forming step.

In embodiments, it is preferable that the iodine and the reducing aqueous solution are respectively added to heated water in the first aqueous solution forming step.

In embodiments, it is preferable that the iodine is added to the heated water a plurality of times.

In embodiments, it is preferable that the method comprises a step of: a LiX adding step of adding LiX (X represents F, Cl, or Br) to the third aqueous solution between the third aqueous solution forming step and the $Li_2S$ forming step.

In addition, the present disclosure provides a method for producing a sulfide solid electrolyte material comprising steps of: a preparation step of preparing a lithium composition by the method for producing a lithium composition described above; and a synthesis step of synthesizing a sulfide solid electrolyte material by reacting the lithium composition with a sulfide other than $Li_2S$.

According to the present disclosure, it is possible to synthesize a sulfide solid electrolyte material containing fewer impurities by using a specific lithium composition.

The method for producing a lithium composition of the present disclosure exhibits an effect that can suppress the generation of polysulfides.

DETAILED DESCRIPTION

Hereinafter, the method for producing a lithium composition and the method for producing a sulfide solid electrolyte material of the present disclosure will be described in detail.

A. Method for Producing Lithium Composition

Figure 1:
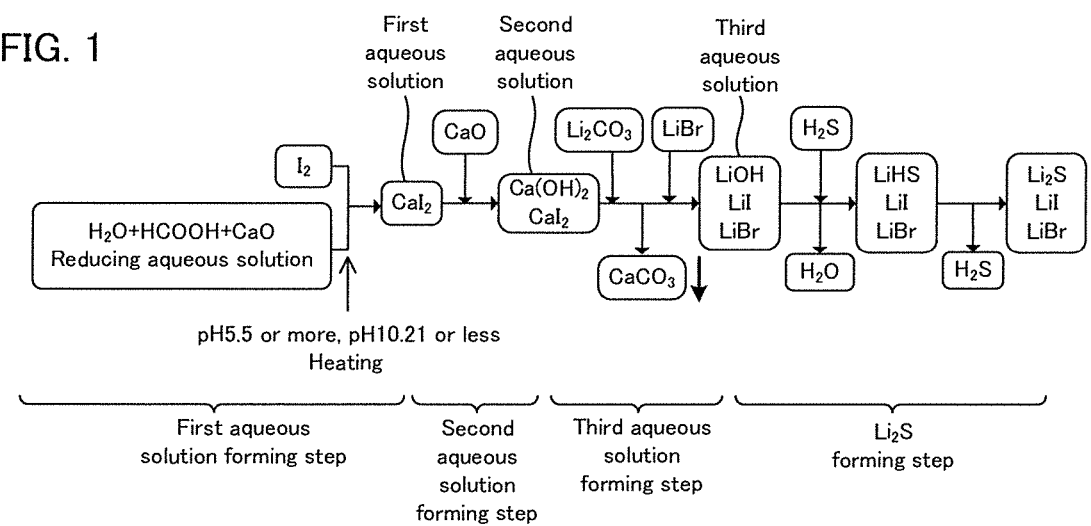
FIG. 1 is a flowchart illustrating a method for producing a lithium composition according to one or more embodiments disclosed herein.

FIG. 1 is a flowchart illustrating an example of the method for producing a lithium composition according to one or more embodiments of the present disclosure. The present disclosure provides a method for producing a lithium composition comprising at least lithium sulfide ($Li_2S$) and lithium iodide (LiI). In FIG. 1, iodine ($I_2$) is reacted with a reducing aqueous solution containing calcium oxide (CaO), formic acid (HCOOH), and water ($H_2O$) under a condition of a pH of 5.5 or more and a pH of 10.21 or less through heating to form a first aqueous solution containing calcium iodide ($CaI_2$) (first aqueous solution forming step). Next, calcium oxide (CaO) is added to the first aqueous solution to form a second aqueous solution containing calcium hydroxide ($Ca(OH)_2$) and calcium iodide ($CaI_2$) (second aqueous solution forming step). Next, lithium carbonate is added to the second aqueous solution to form a third aqueous solution containing lithium hydroxide (LiOH) and lithium iodide (LiI) (third aqueous solution forming step). Next, LiX (such as LiBr) is added to the third aqueous solution (LiX adding step). Next, lithium hydroxide (LiOH) is sulfurized to form lithium hydrosulfide (LiHS) and then hydrogen sulfide is eliminated from lithium hydrosulfide (LiHS) to form lithium sulfide ($Li_2S$) ($Li_2S$ forming step).

According to the present disclosure, it is possible to obtain a lithium composition in which the generation of polysulfides is suppressed by reacting iodine with the reducing aqueous solution containing calcium oxide, formic acid, and water at circumneutral pH in the first aqueous solution forming step.

Figure 2:
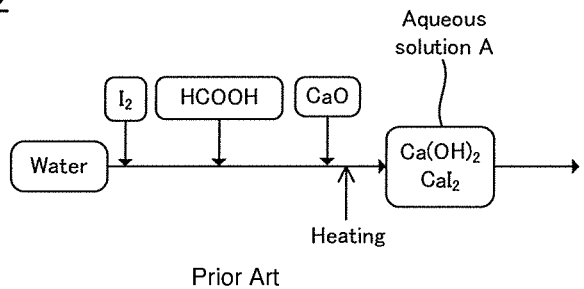
FIG. 2 is a flowchart illustrating an example of a conventional method for producing a lithium composition according to one or more embodiments disclosed herein.

In conventional methods such as illustrated in FIG. 2, iodine, formic acid, and calcium oxide are added to water and then the mixture is heated to form an aqueous solution A containing calcium hydroxide ($Ca(OH)_2$) and calcium iodide ($CaI_2$) (corresponding to the second aqueous solution in the present disclosure). However, polysulfides are generated in the lithium composition to be obtained even if the subsequent steps (the third aqueous solution forming step and $Li_2S$ forming step) are the same as those in the present disclosure. The reason for this is presumed as follows. Referring to FIG. 2, the pH becomes 12 or more at the stage of adding iodine, formic acid, and calcium oxide to water. Iodic acid as an oxidizing substance is generated at the time of the reaction when the reduction reaction is conducted under such a condition containing excess amount of alkali. It is speculated that iodic acid reacts with hydrogen sulfide used in the sulfurization treatment to form a polysulfide as an impurity. In addition, the polysulfide-derived sulfur colloid thus formed causes the composition deviation as well.

On the contrary, in the present disclosure, iodine is reacted with the reducing aqueous solution containing calcium oxide, formic acid, and water at circumneutral pH in the first aqueous solution forming step. Basically, calcium oxide for forming $CaI_2$ (raw material of LiI) and calcium oxide for forming $Ca(OH)_2$ (raw material of $Li_2S$) are added separately. This allows an increase in pH when reacting iodine with the reducing aqueous solution and the generation of iodic acid to be suppressed. Furthermore, in the present disclosure, the reducing aqueous solution contains calcium oxide and formic acid. Alleviation of an increase in pH caused by calcium oxide and suppression of the generation of iodic acid are achieved by combining formic acid. In the present disclosure, the reducing aqueous solution contains calcium oxide as an alkali and thus the reducing aqueous solution is reacted with iodine little by little so that the pH does not excessively increase.

Hereinafter, the each step in the method for producing a lithium composition of the disclosure will be described.

1. First Aqueous Solution Forming Step

The first aqueous solution forming step in the present disclosure is a step of forming a first aqueous solution containing calcium iodide ($CaI_2$) by reacting iodine with a reducing aqueous solution containing calcium oxide, formic acid, and water under a condition of a pH of 5.5 or more and a pH of 10.21 or less through heating. Specifically, the reaction of the following Reaction Formula 1 takes place.

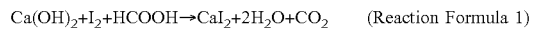

$$Ca(OH)_2 + I_2 + HCOOH \rightarrow CaI_2 + 2H_2O + CO_2 \quad \text{(Reaction Formula 1)}$$

Incidentally, the term "aqueous solution" in the present disclosure refers to a solution containing at least water as a solvent; may contain only water as the solvent or may further contain a solvent other than water. In particular, the proportion of water in the entire solvent is preferably 50% by weight or more in the aqueous solution. These points are not limited to the first aqueous solution but also apply to the other aqueous solutions to be described later.

In the first aqueous solution forming step, iodine is reacted with the reducing aqueous solution under a condition of a pH of 5.5 or more and a pH of 10.21 or less. The "condition of a pH of 5.5 or more and a pH of 10.21 or less" refers to the pH of the solution immediately before iodine reacts with the reducing aqueous solution; specifically, the pH of the solution immediately before the reducing aqueous solution is first added to iodine. The pH in the first aqueous solution forming step is usually a pH of 10.21 or less, and may be 8 or less. Meanwhile, the pH in the first aqueous solution forming step is, for example, 5.5 or more, and may be 7 or more.

In the first aqueous solution forming step, iodine is reacted with the reducing aqueous solution through heating. The heating temperature may be a temperature at which iodine reacts with the reducing aqueous solution and may be a temperature at which iodine reacts with calcium hydroxide and formic acid, and for example, preferably 60° C. or higher and more preferably 75° C. or higher. Meanwhile, the heating temperature is, for example, preferably 90° C. or lower and more preferably 85° C. or lower. Incidentally, iodine is highly volatile so as to be lost by evaporation in some cases even when simply heated. Hence, it is desirable to control the solution temperature to be near the temperature at which the reduction reaction starts.

(1) Iodine

In the present disclosure, iodine is reacted with the reducing aqueous solution. When iodine is reacted with the reducing aqueous solution, iodine may be used singly or an iodine-containing aqueous solution, which contains iodine and water, may be used. Incidentally, examples of the mode of the former may include a mode in which iodine and the reducing aqueous solution are respectively added to heated water. Meanwhile, it is sufficient that at least a part of iodine is dissolved in water in the iodine-containing aqueous solution. In addition, the iodine-containing aqueous solution contains at least water and iodine, but it may contain another compound in a range that the pH of 5.5 or more and 10.21 or less can be maintained. Examples of another compound may include calcium oxide. The pH usually significantly increases as calcium oxide is added, and thus the addible amount of calcium oxide is usually little.

(2) Reducing Solution

The reducing aqueous solution in the present disclosure contains calcium oxide, formic acid, and water. Calcium oxide (CaO) is usually present as calcium hydroxide (Ca(OH)$_2$) in the reducing aqueous solution.

The content of calcium oxide in the reducing aqueous solution is preferably adjusted depending on the amount of iodine to be reacted. Calcium oxide is, for example, in a range of 1.00 mol to 1.10 mol, and preferably in a range of 1.00 mol to 1.05 mol with respect to 1 mol of iodine. Meanwhile, the content of formic acid in the reducing aqueous solution is preferably an amount in which the reduction reaction of iodine sufficiently takes place. Formic acid is, for example, in a range of 1.0 mol to 1.1 mol, and preferably in a range of 1.0 mol to 1.05 mol with respect to 1 mol of iodine.

The concentration of calcium oxide and formic acid in the reducing aqueous solution is, respectively, for example, in a range of 0.3 mol/L to 0.6 mol/L. In addition, the pH of the reducing aqueous solution is, for example, 11 or more.

(3) Reaction of Iodine with Reducing Aqueous Solution

In the first aqueous solution forming step, iodine is reacted with a reducing aqueous solution containing calcium oxide, formic acid, and water under a condition of a pH of 5.5 or more and a pH of 10.21 or less through heating.

Figure 3:
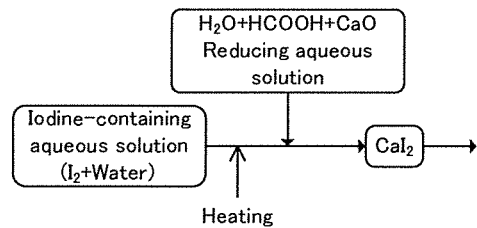
FIG. 3 is a flowchart illustrating an example of steps from a first aqueous solution forming step to a third aqueous solution forming step according to one or more embodiments disclosed herein.

In embodiments, reacting iodine with the reducing aqueous solution is preferably with a method by which the reducing aqueous solution can be reacted with iodine little by little. An example of the method for reacting iodine with the reducing aqueous solution may include a method in which an iodine-containing aqueous solution, which contains iodine and water, is heated and then the reducing aqueous solution is added to the heated iodine-containing aqueous solution as illustrated in FIG. 3. Examples of the method for adding the reducing aqueous solution may include a method in which the reducing aqueous solution is added little by little. For example, the amount of the reducing aqueous solution added per unit time (minute) may be set, for example, to a range of 1 mL to 10 mL. In addition, the time for adding the reducing aqueous solution is, for example, in a range of 1 hour to 10 hours.

Figure 4:
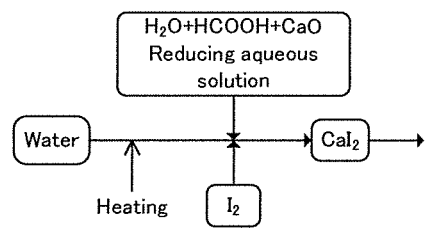
FIG. 4 is a flowchart illustrating an example of steps from a first aqueous solution forming step to a third aqueous solution forming step according to one or more embodiments disclosed herein.

Another example of the method for reacting iodine with the reducing aqueous solution may include a method in which iodine and the reducing aqueous solution are respectively added to heated water as illustrated in FIG. 4. Above all, it is preferable that iodine is added to the heated water a plurality of times. This is because the generation of composition deviation of the lithium composition can be suppressed by suppressing the evaporation of iodine.

It is presumed that the evaporation of iodine occurs for the following reason. It is speculated that a great amount of free iodine is generated when the reaction is conducted under a low pH condition (pH of less than 5.5) and the free iodine is transported to carbon dioxide generated by the reduction reaction taking place at the same time so that iodine exhibiting sublimability also evaporates. The pH of 5.5 is the lowest pH in typical water and the pH of the water which carbonic acid is saturated.

It is presumed that iodic acid is generated by the reaction of iodine with a hydroxide ion when the pH of the solution is high (alkalinity is strong) via the following reaction.

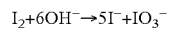

$I_2 + 6OH^- \rightarrow 5I^- + IO_3^-$

Iodic acid has a weak oxidizing power in an alkaline region but becomes a strong oxidizing agent in the acidic to neutral region to oxidize the iodide ion so that iodine ($I_2$) is formed. To maintain the pH of the solution under an alkaline condition is to leave iodic acid in the synthetic substance and to be a cause of the generation of polysulfides in the subsequent step. In addition, it is believed that the pH of the solution becomes locally alkaline and iodic acid is generated when the reducing solution is added at once. After that, it is presumed that the iodine ion is oxidized to form iodine and the amount of iodine lost by evaporation increases as the pH of the solution changes to be circumneutral by stirring. Hence, it is required to conduct the reduction reaction while maintaining the pH of the solution to be circumneutral.

In the case of adding iodine a plurality of times, for example, it is preferable to add the initial portion of iodine at the same time as the start of addition of the reducing aqueous solution or before the start of the addition. The reason is because the pH of the solution can be maintained low. For example, it is preferable to add iodine two to ten times. In addition, in the case of adding iodine a plurality of times, iodine may be added singly or an iodine-containing aqueous solution, which contains iodine and water, may be added.

2. Second Aqueous Solution Forming Step

The second aqueous solution forming step in the present disclosure is a step of forming a second aqueous solution containing calcium hydroxide (Ca(OH)$_2$) and the calcium iodide (CaI$_2$) by adding calcium oxide to the first aqueous solution. Calcium oxide added is usually present as calcium hydroxide in the second aqueous solution.

Calcium oxide to be added in the second aqueous solution forming step is mainly used as a raw material for forming Li$_2$S. The adding amount of calcium oxide can be appropriately selected depending on the proportion of Li$_2$S in the lithium composition.

3. Third Aqueous Solution Forming Step

The third aqueous solution forming step in the present disclosure is a step of forming a third aqueous solution containing lithium hydroxide (LiOH) and lithium iodide (LiI) by adding lithium carbonate to the second aqueous solution. Specifically, the reactions of the following Reaction Formulas 2 and 3 occur.

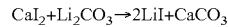

$CaI_2 + Li_2CO_3 \rightarrow 2LiI + CaCO_3$ (Reaction Formula 2)

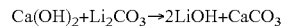

$Ca(OH)_2 + Li_2CO_3 \rightarrow 2LiOH + CaCO_3$ (Reaction Formula 3)

The amount of lithium carbonate added to the second aqueous solution is appropriately adjusted depending on the amounts of calcium hydroxide and calcium iodide contained in the second aqueous solution.

In the third aqueous solution, the molar ratio of LiOH to LiI ($M_{LiOH}/M_{LiI}$) can be appropriately selected depending on the proportion of LiI contained in the intended lithium composition, and for example, preferably 1 or more and preferably 4 or more. In consideration of the state diagram of LiI—LiOH system, it is indicated that a stable phase is formed in the cases of LiI:LiOH=1:1 and LiI:LiOH=1:4. It is speculated that particularly the stable phase at LiI:LiOH=1:4 allows the solid state to be maintained up to 340° C.

In embodiments, a LiX adding step of adding LiX (X represents F, Cl, or Br) to the third aqueous solution may be included between the third aqueous solution forming step and the Li$_2$S forming step to be described later. The adding amount of LiX can be appropriately selected depending on the intended lithium composition.

4. Li$_2$S Forming Step

The Li$_2$S forming step in the present disclosure is a step of forming the lithium sulfide (Li$_2$S) by sulfurizing the lithium hydroxide (LiOH) to form lithium hydrosulfide (LiHS) and then eliminating hydrogen sulfide from the lithium hydrosulfide (LiHS).

In the Li$_2$S forming step, at least a sulfurization treatment to form LiHS by sulfurizing LiOH and a sulfurization treatment to form Li$_2$S by eliminating H$_2$S from LiHS are conducted. In addition, it is preferable to conduct a drying treatment to dry the third aqueous solution before the sulfurization treatment.

(1) Drying Treatment

In the drying treatment, a precursor mixture containing at least LiOH and LiI is obtained by drying the third aqueous solution to remove moisture.

The drying method is not particularly limited, but examples thereof may include drying by heating, drying under reduced pressure (vacuum drying), freeze-drying, spray drying, and an arbitrary combination thereof. Incidentally, freeze-drying is usually a method to dry the target substance by freezing the target substance and subliming the solvent therefrom through pressure reduction using a vacuum pump. In the case of drying by heating, the heating temperature is, for example, in a range of 50° C. to 200° C. and preferably in a range of 120° C. to 190° C.

(2) Sulfurization Treatment

In the sulfurization treatment, LiHS is formed by sulfurizing LiOH and a raw material mixture containing at least LiHS and LiI is obtained.

Examples of the method for sulfurizing LiOH may include a method in which the precursor mixture is reacted with a sulfide gas. Examples of the sulfide gas may include H$_2$S, CS$_2$, and elemental sulfur vapor, and H$_2$S and CS$_2$ are preferable among them. The reason therefor is because there is a possibility that elemental sulfur vapor aggregates with one another or produces polymeric sulfur depending on the condition. Incidentally, the sulfide gas may be diluted with an inert gas such as argon gas. The temperature when reacting the sulfide gas is, for example, in a range of 0° C. to 200° C. and preferably in a range of 100° C. to 150° C. In addition, the time for reacting the sulfide gas is, for example, in a range of 10 minutes to 180 minutes.

The sulfurization of LiOH is preferably conducted in a state in which the precursor mixture is dissolved or dispersed in a solvent or in an inert gas atmosphere, and the former is preferable between them. Incidentally, the term "solvent" in the disclosure includes not only a solvent in which a solute is dissolved in the strict sense but also the meaning of a dispersion medium. In particular, in the disclosure, the sulfurization of LiOH is preferably conducted in a polar solvent since the sulfurization of LiOH can be efficiently conducted. Specific examples of the polar solvent may include a protic polar solvent. An example of the protic polar solvent may include an alcohol having 1 to 8 carbon atoms. Specific examples of the alcohol may include methanol, ethanol, propanol, butanol, t-butyl alcohol, 2-pentanol, 2-methyl-1-butanol, and 2,2-dimethyl-1-propanol. Other examples of the protic polar solvent may include phenols such as phenol and cresol.

(3) Hydrogen Sulfide Eliminating Treatment

In the hydrogen sulfide eliminating treatment, hydrogen sulfide is eliminated from LiHS to form Li$_2$S. Specifically, the reaction of 2LiHS→Li$_2$S+H$_2$S takes place.

The hydrogen sulfide eliminating treatment is not particularly limited, but examples thereof may include a heating treatment. The temperature for the heating treatment is, for example, in a range of 150° C. to 220° C. and preferably in a range of 170° C. to 190° C. Time for the heating treatment is, for example, in a range of 15 minutes to 6 hours and preferably in a range of 30 minutes to 5 hours. In addition, the heating treatment is preferably conducted in a state which the raw material mixture is dissolved or dispersed in a solvent or in an inert gas atmosphere. In the former case, particularly, it is preferable to use an aprotic solvent as the solvent, and a nonpolar aprotic solvent is more preferable. Above all, the solvent used in the hydrogen sulfide eliminating treatment is preferably an alkane that is liquid at 25° C.

In addition, in the present disclosure, the sulfurization treatment and the hydrogen sulfide eliminating treatment may be conducted as a single reaction. Specifically, it is possible to continuously conduct the sulfurization and hydrogen sulfide elimination by setting the temperature when sulfurizing LiOH in the precursor mixture containing LiOH and LiI to be relatively high. In addition, the sulfurization treatment and the hydrogen sulfide eliminating treatment may be continuously conducted in a state which the precursor material mixture is dissolved or dispersed in a solvent.

B. Method for Producing Sulfide Solid Electrolyte Material

Figure 5:
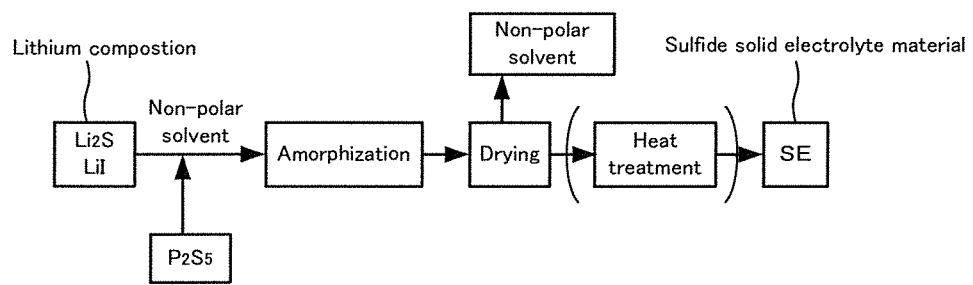
FIG. 5 is a flowchart illustrating a method for producing a sulfide solid electrolyte material according to one or more embodiments disclosed herein.

FIG. 5 is a flowchart illustrating an example of the method for producing a sulfide solid electrolyte material of the present disclosure. As illustrated in FIG. 5, first, a lithium composition containing at least Li$_2$S and LiI is prepared by the producing method described above (preparation step). Next, the lithium composition is reacted with P$_2$S$_5$ (sulfide other than Li$_2$S) to synthesize a sulfide solid electrolyte material (synthesis step). Specifically, the lithium composition is dispersed in a non-polar solvent and P$_2$S$_5$ is added thereto for amorphization of the lithium composition. Thereafter, the non-polar solvent is removed therefrom by drying, whereby a sulfide solid electrolyte material as sulfide glass is obtained. In addition, the sulfide glass is subjected to a heat treatment after being fabricated, whereby a sulfide solid electrolyte material as a glass ceramic is obtained.

According to the present disclosure, it is possible to synthesize a sulfide solid electrolyte material containing fewer impurities by using a specific lithium composition.

1. Preparation Step

The preparation step in the present disclosure is a step of preparing a lithium composition by the method for producing a lithium composition described above. The details are the same as those described in "A. Method for producing a lithium composition" above.

2. Synthesis Step

The synthesis step in the disclosure is a step of synthesizing a sulfide solid electrolyte material by reacting the lithium composition with a sulfide other than Li$_2$S.

The sulfide other than Li$_2$S is not particularly limited as long as the sulfide allows a desired sulfide solid electrolyte material to be obtained, but for example, a composition which contains an A element (A represents P, Si, Ge, Al, or B) and a S element is preferable. Specific examples thereof may include P$_2$S$_3$, P$_2$S$_5$, SiS$_2$, GeS$_2$, Al$_2$S$_3$, and B$_2$S$_3$.

The composition of the sulfide solid electrolyte material is not particularly limited. For example, in the case of synthesizing a sulfide solid electrolyte material using a raw material containing $Li_2S$, $P_2S_5$, and LiI, the proportion of $Li_2S$ to the sum of $Li_2S$ and $P_2S_5$ is preferably in a range of 70 mol % to 80 mol %. The reason therefor is to obtain a sulfide solid electrolyte material exhibiting high chemical stability. The proportion of $Li_2S$ is the same in the case of using $Al_2S_3$ and $B_2S_3$ instead of $P_2S_5$ as well.

Meanwhile, in the case of synthesizing a sulfide solid electrolyte material using a raw material containing $Li_2S$, $SiS_2$, and LiI, the proportion of $Li_2S$ to the sum of $Li_2S$ and $SiS_2$ is preferably in a range of 62.5 mol % to 70.9 mol %. The reason therefor is to obtain a sulfide solid electrolyte material exhibiting high chemical stability. The proportion of $Li_2S$ is the same in the case of using $GeS_2$ instead of $SiS_2$ as well.

The proportion of LiI is, for example, preferably in a range of 1 mol % to 60 mol %, more preferably in a range of 5 mol % to 50 mol %, even more preferably in a range of 10 mol % to 40 mol %, and particularly preferably in a range of 10 mol % to 30 mol %. Incidentally, the proportion of LiI refers to the proportion of LiI to the total sulfide solid electrolyte material. For example, the proportion refers to "x" in $xLiI \cdot (100-x)(Li_3PS_4)$.

The synthesis treatment to synthesize a sulfide solid electrolyte material is not particularly limited as long as it is a treatment by which a desired sulfide solid electrolyte material can be obtained. An example of the synthesis treatment may include an amorphization treatment. A sulfide solid electrolyte material as sulfide glass is obtained by a heat treatment step. Examples of the amorphization treatment may include mechanical milling and a melt quenching method, and mechanical milling is preferable between them. In addition, mechanical milling may be dry mechanical milling or wet mechanical milling.

A heat treatment step may be conducted after the amorphization treatment if necessary. A sulfide solid electrolyte material as a glass ceramic is obtained by the heat treatment step. The temperature for the heat treatment is preferably in a range of 160° C. to 200° C. for example. The time for the heat treatment is preferably in a range of 1 minute to 24 hours for example. In addition, the heat treatment is preferably conducted in an inert gas atmosphere (such as Ar gas atmosphere). Examples of the heat treatment method may include a method using a burning furnace. In addition, the lithium composition and a mixture containing a sulfide other than $Li_2S$ may be subjected to a solid phase reaction treatment. A sulfide solid electrolyte material as a crystalline material is obtained by the solid phase reaction treatment.

3. Sulfide Solid Electrolyte Material

The sulfide solid electrolyte material obtained by the present disclosure comprises at least LiI and usually has an ion conductor other than LiI (such as $Li_3PS_4$). In addition, it is preferable that at least a part of LiI is present in a state of being incorporated into the structure of the ion conductor as the LiI component. In addition, the sulfide solid electrolyte material may have LiX (X represents F, Cl, or Br). It is preferable that at least a part of LiX is present in a state of being incorporated into the structure of the ion conductor as the LiX component.

The ion conductor preferably has, for example, Li, A (A represents at least one kind of P, Si, Ge, Al, or B), and S, and above all, more preferably has an ortho-composition or a near composition thereof. The reason therefor is to obtain a sulfide solid electrolyte material exhibiting high chemical stability. Specifically, it is preferable that the ion conductor includes an anion structure ($PS_4^{3-}$ structure, $SiS_4^{4-}$ structure, $GeS_4^{4-}$ structure, $AlS_3^{3-}$ structure, and $BS_3^{3-}$ structure) of an ortho-composition as the main constituent. The proportion of the anion structure of the ortho-composition is preferably 60 mol % or more with respect to the entire anion structure in the ion conductor. Incidentally, the proportion of the anion structure of the ortho-composition can be determined by, for example, Raman spectroscopy, NMR, and XPS.

It is preferable that the sulfide solid electrolyte material does not substantially contain $Li_2S$ and cross-linking sulfur. The reason therefor is to obtain a sulfide solid electrolyte material generating a smaller amount of hydrogen sulfide. The fact that "$Li_2S$ is not substantially contained" can be confirmed by X-ray diffraction. Specifically, it can be judged that $Li_2S$ is not substantially contained in the case of not having the peak of $Li_2S$ ($2\theta=27.0°$, $31.2°$, $44.8°$, and) $53.1°$. Meanwhile, the cross-linking sulfur refers to cross-linking sulfur in the compound formed by the reaction of $Li_2S$ with a sulfide of the above described "A". For example, cross-linking sulfur in the $S_2P$—S—$PS_2$ structure formed by the reaction of $Li_2S$ with $P_2S_5$ corresponds to the cross-linking sulfur. The fact that "cross-linking sulfur is not substantially contained" can be confirmed by the measurement of Raman spectrum. For example, in the case of a $Li_2S$—$P_2S_5$-based sulfide solid electrolyte material, the peak of $S_2P$—S—$PS_2$ structure usually appears at $402=cm^{-1}$. Hence, it is preferable that this peak is not detected.

Examples of the shape of the sulfide solid electrolyte material may include a granular shape. The average particle size ($D_{50}$) of the sulfide solid electrolyte material is preferably, for example, in a range of from 0.1 μm to 50 μm. In addition, it is preferable that the sulfide solid electrolyte material exhibits high Li ion conductivity, and the Li ion conductivity at 25° C. is, for example, $1 \times 10^{-4}$ S/cm or more and preferably $1 \times 10^{-3}$ S/cm or more. In addition, the sulfide solid electrolyte material can be used in an arbitrary application that utilizes Li ion conduction, and the usage for a battery is preferable above all.

Incidentally, the present disclosure is not limited to the above embodiments. The above embodiments are illustrative, and any of those which have substantially the same configuration and exhibit the same effects as the technical concept described in the claims of the present disclosure is encompassed in the technical scope of the present disclosure.

EXAMPLES

Hereinafter, the present disclosure will be more specifically described with reference to Examples.

Comparative Example 1

In Comparative Example 1, a lithium composition was fabricated by a conventional method. Into a four-neck flask, 600 ml of pure water and 1.523 g of calcium oxide were added. Subsequently, 0.530 g of iodine and 0.114 g of formic acid (concentration: 88%) were added thereto, and the mixture was heated to 80° C. The pH thereof was at least 12 or more. After confirming the dissolution of iodine, 2.006 g of lithium carbonate was added thereto. After stopping heating, the resultant was stirred for 3 hours or longer and then filtered. To the filtrate, 0.363 g of lithium bromide was added. Next, the filtrate was concentrated and dried using an evaporator. The powder thus obtained was white.

The powder thus obtained was added to a tridecanepentanol mixed solution. $H_2S$ gas was circulated for 2 hours at 120° C. while stirring the solution thus obtained (sulfurization treatment). The solution was colored to green immediately after blowing the $H_2S$ gas thereinto, and the coloration became stronger with time. The solution was maintained at 190° C. for 4 hours in a state of circulating $H_2S$ gas to remove the alcohol. Thereafter, the resultant was stirred at 190° C. for about 5 hours in a state of circulating Ar gas to eliminate hydrogen sulfide from LiHS (hydrogen sulfide eliminating treatment). As a result, a dark green slurry was obtained, and this slurry was filtered to obtain a black powder.

Meanwhile, lithium iodide (purchased reagent) was mixed with lithium hydroxide (purchased reagent) to fabricate a mixed material of lithium iodide and lithium hydroxide. Specifically, the purchased reagents were dissolved in pure water, the solution was concentrated using the evaporator and then dried at 150° C. in an argon stream, and the resultant was used as the mixed material. This mixed material was subjected to a sulfurization treatment, and a white powder was obtained. In other words, a mixed material which did not undergo an aqueous synthesis was subjected to the sulfurization treatment, and a white powder was obtained. The purchased reagents were dissolved in pure water, respectively. This solution was concentrated using the evaporator and then dried at 150° C. in an argon stream.

From the comparison with the mixed material which did not undergo an aqueous synthesis, the dark green slurry in Comparative Example 1 was assumed to be contaminated with the sulfur colloid. Accordingly, the filtrate of the dark green slurry was subjected to the elemental analysis, and the presence of sulfur was confirmed. From these results, it is presumed that the generation of sulfur colloid is caused by the generation of iodic acid and the reaction of iodic acid with hydrogen sulfide in the synthesis system. Accordingly, whether it is effective to set the pH of the solution at the time of adding iodine to the neutral region in order to suppress the generation of iodic acid was confirmed as follows.

Example 1

In Example 1, in order to suppress an increase in pH of the solution in the lithium iodide synthesis, a reducing solution was gradually added to an iodine-containing aqueous solution to fabricate a lithium composition. Into a four-neck flask, 400 ml of pure water and 0.530 g of iodine were added and then heated to 80° C. The pH thereof was 7. In advance, a reducing solution was prepared by mixing 0.117 g of calcium oxide and 0.114 g of formic acid (concentration: 88%) with 200 ml of pure water, and this was added into the four-neck flask taking 1 hour or longer. After confirming the dissolution of iodine, 1.406 g of calcium oxide and 2.006 g of lithium carbonate were added thereto. After stopping heating, the mixture was stirred for 3 hours or longer, and the resultant was filtered. To the filtrate, 0.363 g of lithium bromide was added. Next, the filtrate was concentrated and dried using the evaporator. The powder thus obtained was white.

The powder thus obtained was subjected to the same sulfurization treatment and the hydrogen sulfide eliminating treatment as those in Comparative Example 1. As the result, the coloration of the powder after the sulfurization treatment was significantly little or almost negligible. In addition, the powder after the hydrogen sulfide eliminating treatment was light gray. Incidentally, vigorous evaporation of iodine was confirmed at the time of adding the reducing solution.

Example 2

In Example 2, in order to investigate the upper limit of the pH of the solution in the lithium iodide synthesis, a part of calcium oxide to be used was added to the iodine-containing aqueous solution to fabricate a lithium composition. Into a four-neck flask, 400 ml of pure water, 0.530 g of iodine, 1 mg of calcium oxide were added and then heated to 80° C. The pH thereof was 10.21. In advance, a reducing solution was prepared by mixing 0.117 g of calcium oxide and 0.114 g of formic acid (concentration: 88%) with 200 ml of pure water, and this was added into the four-neck flask taking 1 hour or longer. After confirming the dissolution of iodine, 1.405 g of calcium oxide and 2.006 g of lithium carbonate were added thereto. After stopping heating, the mixture was stirred for 3 hours or longer, and the resultant was filtered. To the filtrate, 0.363 g of lithium bromide was added. Next, the filtrate was concentrated and dried using the evaporator. The powder thus obtained was white.

The powder thus obtained was subjected to the same sulfurization treatment and the hydrogen sulfide eliminating treatment as those in Comparative Example 1. As the result, the coloration of the powder after the sulfurization treatment was significantly little or almost negligible. In addition, the powder after the hydrogen sulfide eliminating treatment was light gray. Incidentally, evaporation of iodine was confirmed at the time of adding the reducing solution.

Comparative Example 2

In Comparative Example 2, in order to investigate the upper limit of the pH of the solution in the lithium iodide synthesis, a part of calcium oxide to be used was added to the iodine-containing aqueous solution to fabricate a lithium composition. Into a four-neck flask, 400 ml of pure water and 0.530 g of iodine were added, a reducing solution prepared by mixing 0.117 g of calcium oxide and 0.114 g of formic acid (concentration: 88%) with 200 ml of pure water in advance was further added thereto, and the mixture was then heated to 80° C. The pH thereof was 11.50. After confirming the dissolution of iodine, 1.406 g of calcium oxide and 2.006 g of lithium carbonate were added thereto. After stopping heating, the mixture was stirred for 3 hours or longer, and the resultant was filtered. To the filtrate, 0.363 g of lithium bromide was added. Next, the filtrate was concentrated and dried using the evaporator. The powder thus obtained was white.

The powder thus obtained was subjected to the same sulfurization treatment and the hydrogen sulfide eliminating treatment as those in Comparative Example 1. As the result, the solution was colored to green immediately after blowing hydrogen sulfide thereinto, and the coloration became stronger with time. A dark green slurry was obtained by the hydrogen sulfide eliminating treatment, and the powder obtained by filtering this slurry was ashy black. Incidentally, vigorous evaporation of iodine was not confirmed at the time of adding the reducing solution.

Example 3

In Example 3, a lithium composition was fabricated by maintaining the pH of the solution in the lithium iodide synthesis to be circumneutral and further introducing iodine in a divided manner. Into a four-neck flask, 400 ml of pure water was added and then heated to 80° C. The pH thereof was 7. After dividing 0.530 g of iodine into six portions, six portions of iodine were added to the four-neck flask at approximately 20 minute intervals. In addition, a reducing solution was prepared by mixing 0.117 g of calcium oxide and 0.114 g of formic acid (concentration: 88%) with 200 ml of pure water in advance, this was started to be injected into the four-neck flask at the same time as the first introduction of iodine, and the entire amount of the reducing solution was added taking about 2 hours. After confirming the dissolution of iodine, 1.406 g of calcium oxide and 2.006 g of lithium carbonate were added thereto. After stopping heating, the mixture was stirred for 3 hours or longer, and the resultant was filtered. To the filtrate, 0.363 g of lithium bromide was added. Next, the filtrate was concentrated and dried using the evaporator. The powder thus obtained was white.

The powder thus obtained was subjected to the same sulfurization treatment and the hydrogen sulfide eliminating treatment as those in Comparative Example 1. As the result, the coloration of the powder after the sulfurization treatment was significantly little or almost negligible. In addition, the powder after the hydrogen sulfide eliminating treatment was light gray. Incidentally, evaporation of iodine was confirmed at the time of adding the reducing solution. Incidentally, vigorous evaporation of iodine was not confirmed at the time of adding the reducing solution. The experimental conditions in Examples 1 to 3 and Comparative Examples 1 and 2 are presented in Table 1.

Meanwhile, focused on the results of Examples 1 and 3, the evaporation of iodine can be suppressed even in the neutral region in Example 3. In other words, it is possible to achieve both the suppression of polysulfide generation and the suppression of iodine evaporation in Example 3. In addition, the change in composition in Examples 1 and 3 is presented in Table 2. Incidentally, the numerical values in parentheses in Table 2 represent the amount (% by weight) deviated from the theoretical values.

TABLE 2

|  | Li | I | Br |
|---|---|---|---|
| Theoretical value | 1.22 | 1.59 | 1 |
| Example 1 | 1.15 | 1.51 | 1 |
| (collective addition of $I_2$) | (−6%) | (−5%) |  |
| Example 3 | 1.26 | 1.59 | 1 |
| (divided addition of $I_2$) | (+3%) | (0%) |  |

As presented in Table 2, in Example 1, I is deviated from the theoretical value (charged amount) by about 5% by weight. On the contrary, in Example 3, I has approximately the same value as the theoretical value (charged amount). Consequently, it has been confirmed that the evaporation of iodine can be suppressed in Example 3. Consequently, the amount of iodine decreased is preferably less than 5% by weight, more preferably 3% by weight or less, and even more preferably 1% by weight or less.

TABLE 1

|  |  | Comparative Example 1 | Example 1 | Example 2 | Comparative Example 2 | Example 3 |
|---|---|---|---|---|---|---|
| Aqueous solution | Water (ml) | 600 | 400 | 400 | 400 | 400 |
|  | CaO(g) | 1.523 | 0 | 0.001 | 0 | 0 |
|  | HCOOH(g) | 0.114 | 0 | 0 | 0 | 0 |
|  | $I_2$(g) | 0.530 | 0.530 | 0.530 | 0.530 | 0.530 |
|  | Divided introduction of $I_2$ | Absence | Absence | Absence | Absence | Presence |
| Reducing aqueous solution | Water (ml) | 0 | 200 | 200 | 200 | 200 |
|  | CaO (g) | 0 | 0.117 | 0.117 | 0.117 | 0.117 |
|  | HCOOH (g) | 0 | 0.114 | 0.114 | 0.114 | 0.114 |
|  | $I_2$ (g) | 0 | 0 | 0 | 0 | 0 |
| pH (At the time of start) |  | ≥12 | 7 | 10.21 | 11.5 | 7 |
|  | CaO(g) | 0 | 1.406 | 1.405 | 1.406 | 1.406 |
|  | $Li_2CO_3$(g) | 2.006 | 2.006 | 2.006 | 2.006 | 2.006 |
|  | LiBr(g) | 0.363 | 0.363 | 0.363 | 0.363 | 0.363 |
|  | Polysulfide | Presence | Absence | Absence | Presence | Absence |
| Composition deviation of iodine |  | — | Presence | Presence | Absence | Absence |

Evaluation

Presence or Absence of Suppression of Polysulfide

In Examples 1 to 3, it has been confirmed that it is possible to suppress the generation of polysulfides from the fact that coloration due to the sulfurization treatment is suppressed and a light gray powder is obtained.
(Presence or Absence of Composition Deviation of Iodine)

The powders obtained in Examples 1 to 3 and Comparative Example 2 were subjected to the elemental analysis, and the amount of iodine decreased (amount deviated from the charged amount, % by weight) was calculated. The sample weighed was dissolved in an alkaline solution. Incidentally, the sample may be dissolved in pure water. A constant volume of the solution was taken and then subjected to the measurement by ICP emission spectroscopy. The proportions of Li and I were normalized by the weight of lithium bromide.

Figure 6:
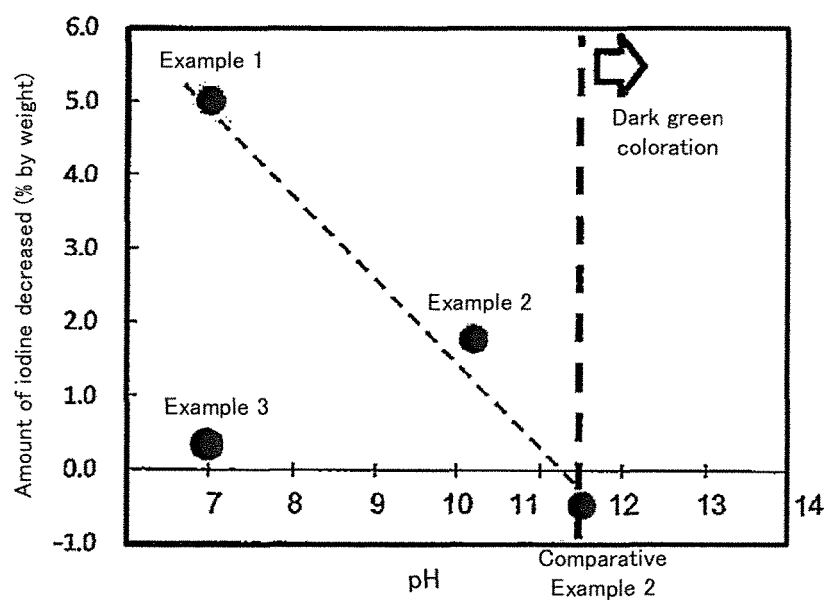
FIG. 6 is a graph illustrating the relation between the initial pH and the amount (% by weight) of iodine decreased in Examples 1 to 3 and Comparative Example 2.

The amount of iodine decreased and the initial pH (pH in the first aqueous solution forming step) are illustrated in FIG. 6. As illustrated in FIG. 6, focused on the results of Examples 1 and 2 and Comparative Example 2, it has been indicated that the evaporation of iodine can be further suppressed as the pH is higher (incidentally, a greater amount of polysulfides are produced as the pH is higher).

What is claimed is:
1. A method for producing a lithium composition, the lithium composition comprising at least lithium sulfide ($Li_2S$) and lithium iodide (LiI); the method comprising:
forming a first aqueous solution containing calcium iodide ($CaI_2$) by reacting iodine with a reducing aqueous solution containing calcium oxide, formic acid, and water under a condition of a pH of 5.5 or more and a pH of 10.21 or less through heating;
forming a second aqueous solution containing calcium hydroxide ($Ca(OH)_2$) and the calcium iodide ($CaI_2$) by adding calcium oxide to the first aqueous solution;
forming a third aqueous solution containing lithium hydroxide (LiOH) and lithium iodide (LiI) by adding lithium carbonate to the second aqueous solution; and
forming $Li_2S$ by sulfurizing the lithium hydroxide (LiOH) to form lithium hydrosulfide (LiHS) and then eliminating hydrogen sulfide from the lithium hydrosulfide (LiHS).

2. The method for producing a lithium composition according to claim 1, wherein an iodine-containing aqueous solution, which contains the iodine and water, is heated and then the reducing aqueous solution is added to the heated iodine-containing aqueous solution during forming of the first aqueous solution.

3. The method for producing a lithium composition according to claim 1 wherein the iodine and the reducing aqueous solution are respectively added to heated water during forming the first aqueous solution.

4. The method for producing a lithium composition according to claim 3 wherein the iodine is added to the heated water a plurality of times.

5. The method for producing a lithium composition according to claim 1, further comprising:
   adding LiX (X represents F, Cl, or Br) to the third aqueous solution between forming the third aqueous solution and forming the $Li_2S$.

6. A method for producing a sulfide solid electrolyte material, the method comprising:
   preparing a lithium composition by the method for producing a lithium composition according to claim 1; and
   synthesizing a sulfide solid electrolyte material by reacting the lithium composition with a sulfide other than $Li_2S$.

* * * * *

UNITED STATES PATENT AND TRADEMARK OFFICE
CERTIFICATE OF CORRECTION

PATENT NO. : 9,923,233 B2
APPLICATION NO. : 15/172739
DATED : March 20, 2018
INVENTOR(S) : Yuichi Hashimoto et al.

It is certified that error appears in the above-identified patent and that said Letters Patent is hereby corrected as shown below:

In the Specification

In Column 3, Line 30, delete "forma" and insert --form a--, therefor.

In Column 9, Line 67, delete "$BS_3^{3}$" and insert --$BS_3^{3-}$--, therefor.

In Column 10, Line 15, after "and", delete ")" and after "53.1°", insert --)--, therefor.

In Column 10, Line 19, delete "$S_2P$-S-$PS_2$" and insert --$S_3P$-S-$PS_3$--, therefor.

In Column 10, Line 24, delete "$S_2P$-S-$PS_2$" and insert --$S_3P$-S-$PS_3$--, therefor.

Signed and Sealed this
Twenty-fourth Day of April, 2018

Andrei Iancu
*Director of the United States Patent and Trademark Office*